(12) United States Patent
Fujiwara et al.

(10) Patent No.: US 11,503,191 B2
(45) Date of Patent: Nov. 15, 2022

(54) IMAGE-CAPTURING APPARATUS WITH HOLDING MEMBER FOR HOLDING OPTICAL MEMBER

(71) Applicant: CANON KABUSHIKI KAISHA, Tokyo (JP)

(72) Inventors: Daisuke Fujiwara, Tokyo (JP); Tomoya Onaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 199 days.

(21) Appl. No.: 16/842,803

(22) Filed: Apr. 8, 2020

(65) Prior Publication Data

US 2020/0329182 A1 Oct. 15, 2020

(30) Foreign Application Priority Data

Apr. 10, 2019 (JP) .............................. JP2019-074542
May 13, 2019 (JP) .............................. JP2019-090883
May 27, 2019 (JP) .............................. JP2019-098375
Sep. 9, 2019 (JP) .............................. JP2019-163542

(51) Int. Cl.
*H04N 5/225* (2006.01)
*G02B 7/02* (2021.01)
(Continued)

(52) U.S. Cl.
CPC .............. *H04N 5/2254* (2013.01); *G02B 7/02* (2013.01); *G02B 7/021* (2013.01); *G02B 7/08* (2013.01); *G03B 17/12* (2013.01); *H04N 5/2252* (2013.01); *H04N 5/2253* (2013.01); *G02B 5/20* (2013.01); *G03B 2205/0053* (2013.01)

(58) Field of Classification Search
CPC ....................................................... G03B 17/12
See application file for complete search history.

(56) References Cited

U.S. PATENT DOCUMENTS

| 4,090,069 A | 5/1978 | Lisfeld et al. |
| 4,827,348 A | 5/1989 | Ernest et al. |

(Continued)

FOREIGN PATENT DOCUMENTS

| CN | 1964436 A | 5/2007 |
| CN | 101236280 A | 8/2008 |

(Continued)

OTHER PUBLICATIONS

Aug. 26, 2021 Chinese Official Action in Chinese Patent Appln. No. 202010267507.9.

(Continued)

*Primary Examiner* — Gary C Vieaux
(74) *Attorney, Agent, or Firm* — Venable LLP

(57) ABSTRACT

An image-capturing apparatus comprises a board configured to hold an image sensor, a holding member configured to hold an optical member so as to be insertable into and removable from an optical path, the holding member being held between a lens barrel and the image sensor, and a sealing member configured to surround a periphery of a light receiving surface of the image sensor, the sealing member being provided on a side of the image sensor with respect to the optical member, wherein the sealing member includes a first sealing portion which contact the board and a second sealing portion which contacts the holding member.

17 Claims, 9 Drawing Sheets

(51) Int. Cl.
*G02B 7/08* (2021.01)
*G03B 17/12* (2021.01)
*G02B 5/20* (2006.01)

(56) References Cited

U.S. PATENT DOCUMENTS

| | | |
|---|---|---|
| 6,137,958 A | 10/2000 | Toyoda |
| 7,639,301 B2 | 12/2009 | Niwamae et al. |
| 7,830,444 B2 | 11/2010 | Matsumoto |
| 7,973,854 B2 | 7/2011 | Kobayashi |
| 8,243,250 B2 | 8/2012 | Yamamiya |
| 8,428,455 B2 | 4/2013 | Asai et al. |
| 8,638,386 B2 | 1/2014 | Mukai |
| 8,792,050 B2 | 7/2014 | Shinohara et al. |
| 8,953,086 B2 | 2/2015 | Mukai |
| 9,609,188 B2 | 3/2017 | Iwamatsu |
| 2006/0044447 A1 | 3/2006 | Takagi |
| 2006/0077284 A1 | 4/2006 | Kurosawa |
| 2006/0268232 A1 | 11/2006 | Jin |
| 2007/0103579 A1 | 5/2007 | Niwamae et al. |
| 2008/0106805 A1 | 5/2008 | Aiba |
| 2008/0143868 A1 | 6/2008 | Tsuchiya et al. |
| 2008/0180562 A1 | 7/2008 | Kobayashi |
| 2008/0259200 A1 | 10/2008 | Matsumoto |
| 2009/0231537 A1 | 9/2009 | Yamamiya |
| 2010/0111516 A1 | 5/2010 | Basho |
| 2010/0157137 A1 | 6/2010 | Imai et al. |
| 2010/0172036 A1 | 7/2010 | Qian |
| 2011/0008038 A1 | 1/2011 | Halliday |
| 2011/0058805 A1 | 3/2011 | Asai et al. |
| 2011/0090578 A1 | 4/2011 | Yoshimura |
| 2011/0298970 A1 | 12/2011 | Shinohara et al. |
| 2012/0169920 A1 | 7/2012 | Mukai |
| 2012/0257097 A1 | 10/2012 | Takai |
| 2012/0281282 A1 | 11/2012 | Kudoh |
| 2012/0320202 A1 | 12/2012 | Qian |
| 2013/0148222 A1 | 6/2013 | Wang et al. |
| 2014/0002676 A1 | 1/2014 | Ning |
| 2014/0104489 A1 | 4/2014 | Mukai |
| 2015/0002730 A1 | 1/2015 | Shi et al. |
| 2015/0042818 A1 | 2/2015 | Wada et al. |
| 2015/0070563 A1 | 3/2015 | Sperber |
| 2016/0006958 A1* | 1/2016 | Iwamatsu ............ H04N 5/2253 348/294 |
| 2018/0172943 A1 | 6/2018 | Lee |
| 2019/0064473 A1 | 2/2019 | Suzuki |
| 2019/0076007 A1 | 3/2019 | Higashiyama et al. |
| 2019/0187404 A1 | 6/2019 | Onaka |
| 2020/0029780 A1 | 1/2020 | Woo et al. |
| 2020/0077027 A1 | 3/2020 | Onaka |
| 2020/0329180 A1 | 10/2020 | Fujiwara et al. |
| 2020/0329182 A1 | 10/2020 | Fujiwara et al. |
| 2020/0329183 A1 | 10/2020 | Onaka et al. |

FOREIGN PATENT DOCUMENTS

| | | |
|---|---|---|
| CN | 101246300 A | 8/2008 |
| CN | 101986182 A | 3/2011 |
| CN | 102012610 A | 4/2011 |
| CN | 102405439 A | 4/2012 |
| CN | 102577351 A | 7/2012 |
| CN | 102636938 A | 8/2012 |
| CN | 202631926 U | 12/2012 |
| CN | 103268050 A | 8/2013 |
| CN | 203405615 U | 1/2014 |
| CN | 203502715 U | 3/2014 |
| CN | 203535359 U | 4/2014 |
| CN | 105301871 A | 2/2016 |
| CN | 108241245 A | 7/2018 |
| CN | 208479813 U | 2/2019 |
| CN | 109425949 A | 3/2019 |
| EP | 3722872 A1 | 10/2020 |
| JP | H04-163429 A | 6/1992 |
| JP | 2002-330320 A | 11/2002 |
| JP | 2006-074654 A | 3/2006 |
| JP | 2006-258969 A | 9/2006 |
| JP | 2012-173523 A | 9/2012 |
| JP | 2016-015617 A | 1/2016 |
| JP | 2016-122074 A | 7/2016 |
| JP | 2018-074224 A | 5/2018 |
| TW | 200827900 A | 7/2008 |
| WO | 00/26700 A1 | 5/2000 |

OTHER PUBLICATIONS

Nov. 24, 2020 Japanese Official Action in Japanese Patent Appln. No. 2019-163542.
Aug. 31, 2021 Chinese Official Action in Chinese Patent Appln. No. 202010267465.9.
Sep. 3, 2021 Chinese Official Action in Chinese Patent Appln. No. 202010267468.2.
Aug. 7, 2020 European Search Report in European Patent Appln. No. 20168641.7.
Aug. 13, 2020 European Search Report in European Patent Appln. No. 20168642.5.
Aug. 27, 2020 European Search Report in European Patent Appln. No. 20168643.3.
Jan. 13, 2022 Chinese Official Action in Chinese Patent Appln. No. 202010267465.9.

* cited by examiner

IMAGE-CAPTURING APPARATUS WITH HOLDING MEMBER FOR HOLDING OPTICAL MEMBER

BACKGROUND OF THE INVENTION

Field of the Invention

The present invention relates to an image-capturing apparatus, and more particularly to an image-capturing apparatus provided with a mechanism for inserting an optical member such as a filter into an optical path and removing the optical member from the optical path.

Description of the Related Art

Conventionally, in order to obtain an image using infrared rays in an image capturing at night or in a dark place, an image-capturing apparatus such as a monitoring camera has been provided with a filter switching mechanism for removing a filter for blocking infrared rays from an optical path by using a driver such as a motor.

For example, Japanese Patent Application Laid-Open No. ("JP") H4-163429 discloses a filter switching unit having a filter switching mechanism for sliding a filter frame holding a filter into an optical path by using a mechanism for sliding blades by an actuator having a lever. JPH4-163429 discloses a configuration in which the filter switching unit is inserted through an opening portion provided on a side surface of a lens barrel.

However, in the prior art disclosed in JPH4-163429, foreign substances enter through a gap between the filter switching unit and the opening portion provided on the side surface of the lens barrel, and adheres to a light receiving surface of an image sensor, and image quality is degraded.

SUMMARY OF THE INVENTION

The present invention provides, in a configuration in which a filter switching mechanism for inserting a filter as an optical member into an optical path and removing the filter from the optical path is provided between a lens barrel and an image sensor, an image-capturing apparatus capable of preventing foreign substances from adhering to a light receiving surface of the image sensor.

An image-capturing apparatus according to one aspect of the present invention includes a board configured to hold an image sensor, a holding member configured to hold an optical member so as to be insertable into and removable from an optical path, the holding member being held between a lens barrel and the image sensor, and a sealing member configured to surround a periphery of a light receiving surface of the image sensor, the sealing member being provided on a side of the image sensor with respect to the optical member, wherein the sealing member includes a first sealing portion which contact the board and a second sealing portion which contacts the holding member.

Further features of the present invention will become apparent from the following description of exemplary embodiments with reference to the attached drawings.

DESCRIPTION OF THE EMBODIMENTS

Figure 1:
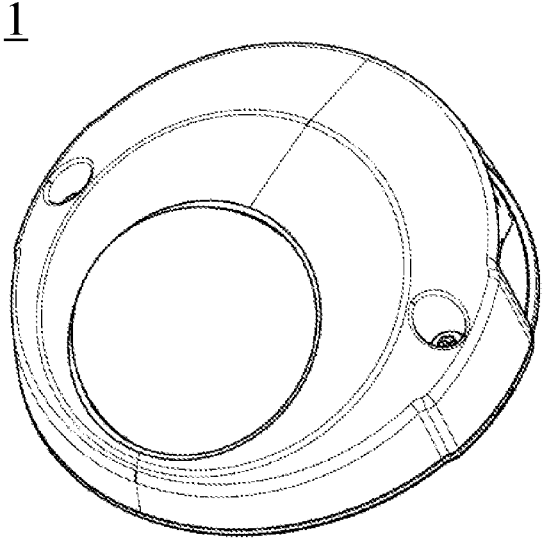
FIG. 1 is a perspective view of an image-capturing apparatus according to a first embodiment of the present invention.

Hereinafter, preferred embodiments of the present invention will be described in detail with reference to the accompanying drawings. FIG. 1 is a perspective view of an image-capturing apparatus according to embodiments of the present invention.

First Embodiment

Hereinafter, the image-capturing apparatus according to a first embodiment of the present invention will be described with reference to FIGS. 1-13.

Figure 2:
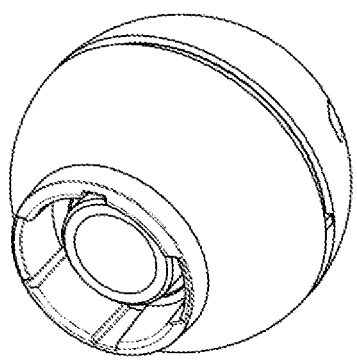
FIG. 2 is a perspective view of a camera unit according to the first embodiment of the present invention.
Figure 3:
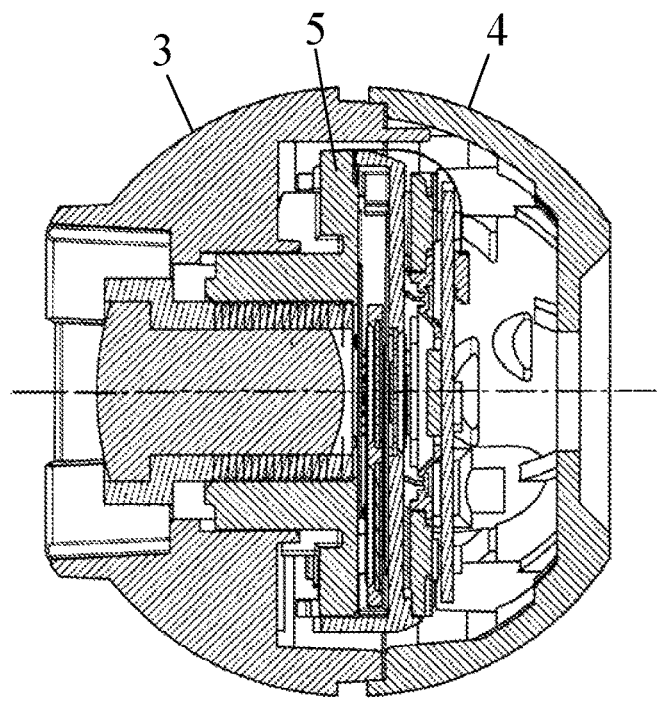
FIG. 3 is a cross-sectional view of the camera unit according to the first embodiment of the present invention.

In FIG. 1, reference numeral 1 denotes the image-capturing apparatus. In FIG. 2, reference numeral 2 denotes a camera unit included in the image-capturing apparatus 1. FIG. 3 is a cross-sectional view of the camera unit 2.

Reference numeral 3 denotes a front holder, and reference numeral 4 denotes a rear holder. Reference numeral 5 denotes a lens barrel unit. The lens barrel unit 5 is sandwiched by the front holder 3 and the rear holder 4 and fixed therebetween.

Figure 4:
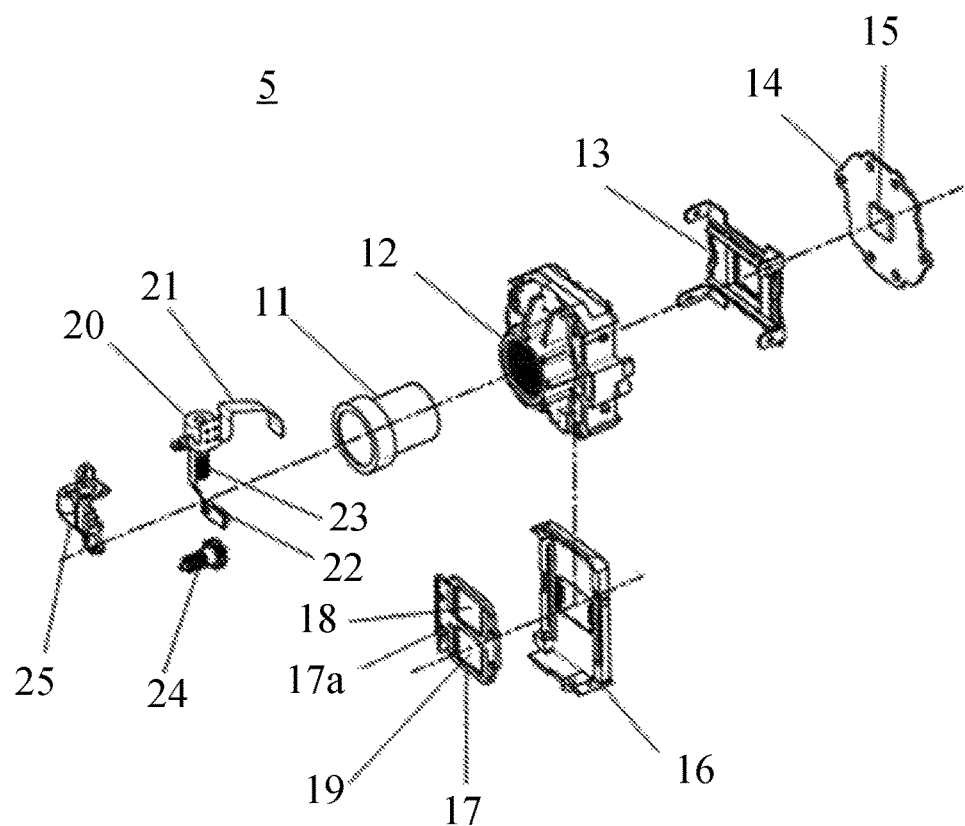
FIG. 4 is an exploded perspective view of a lens barrel unit according to the first embodiment of the present invention.

FIG. 4 is an exploded perspective view of the lens barrel unit 5. Reference numeral 11 denotes an image-capturing lens unit, and reference numeral 12 denotes a fixed lens barrel (lens barrel). The image-capturing lens unit 11 is screwed and fixed into the fixed lens barrel 12. Reference numeral 13 denotes a dustproof rubber (sealing member) made of an elastic member, and reference numeral 14 denotes an image sensor board (board). Reference numeral 15 denotes an image sensor, which is mounted on the image sensor board 14. The image sensor board 14 is fixed to the fixed lens barrel 12, and the dustproof rubber 13 is sandwiched by the fixed lens barrel 12 and the image sensor board 14.

Reference numeral 16 denotes a filter base (holding member). Reference numeral 17 denotes a filter holding frame (optical member holding frame), and a rack gear 17*a* is formed on one side surface of the filter holding frame 17. Reference numeral 18 denotes an infrared cut filter as an optical member, reference numeral 19 denotes a dummy glass, and these are fixed to the filter holding frame 17. The filter holding frame 17 is held on the filter base 16 so as to be movable in a direction orthogonal to an optical axis of the image-capturing lens unit 11, and the filter base 16 is inserted through an opening portion provided on a side surface of the fixed lens barrel 12 and is held by the fixed lens barrel 12. Reference numeral 20 denotes an actuator for driving the filter holding frame 17 in the direction orthogonal to the optical axis. Reference numeral 21 denotes a flexible printed circuit board connected to the actuator 20. Reference numeral 22 denotes a photo-interrupter for detecting a position of the filter holding frame 17 in the direction orthogonal to the optical axis, and the photo-interrupter 22 is mounted on the flexible printed board 21. Reference numeral 23 denotes a worm gear, which is fixed to a rotation shaft of a rotor of the actuator 20. Reference numeral 24 denotes an intermediate gear. A pinion gear that meshes with a rack gear 17*a* formed on the filter holding frame 17 is formed coaxially with a helical gear that meshes with the worm gear 23. Reference numeral 25 denotes a gear cover which holds the actuator 20 and rotatably sandwiches the intermediate gear 24 with the fixed lens barrel 12.

Figure 5:
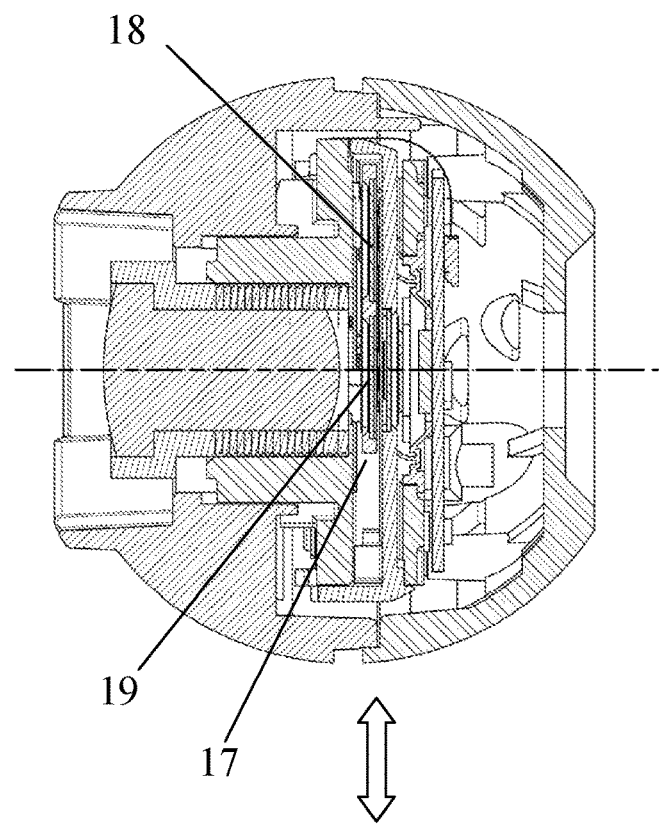
FIG. 5 is a cross-sectional view of the camera unit according to the first embodiment of the present invention, in a state where a dummy glass is inserted into an optical path.

Next, a filter switching operation of this embodiment will be described with reference to FIG. 4. When a drive signal is input to the actuator 20 via electric wiring (not shown) connected to the image sensor board 14, the rotor of the actuator 20 rotates around the rotation shaft. When the rotor of the actuator 20 rotates, the intermediate gear 24 having the helical gear that meshes with the worm gear 23 fixed to the rotation shaft of the rotor of the actuator 20 rotates. When the intermediate gear 24 rotates, the filter holding frame 17 whose rack gear 17*a* meshes with a spur gear of the intermediate gear 24 moves in the direction orthogonal to the optical axis. A drive signal is input to the actuator 20 so as to stop when the filter holding frame 17 moves by a predetermined movement amount. FIG. 3 illustrates a state in which the infrared cut filter 18 is inserted into an optical path, while FIG. 5 illustrates a state in which the dummy glass 19 is inserted into the optical path. By driving the filter holding frame 17 in the direction orthogonal to the optical axis indicated by an arrow in FIG. 5, the infrared cut filter 18 or the dummy glass 19 is selectively inserted into and removed from the optical path.

Figure 6:
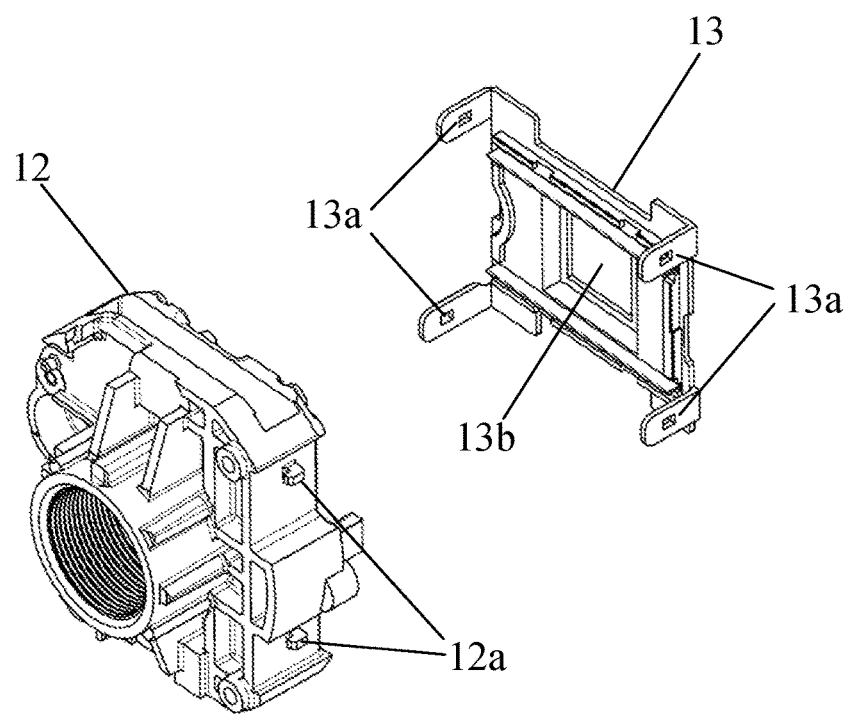
FIG. 6 is a perspective view of a fixed lens barrel and a dustproof rubber according to the first embodiment of the present invention.
Figure 7:
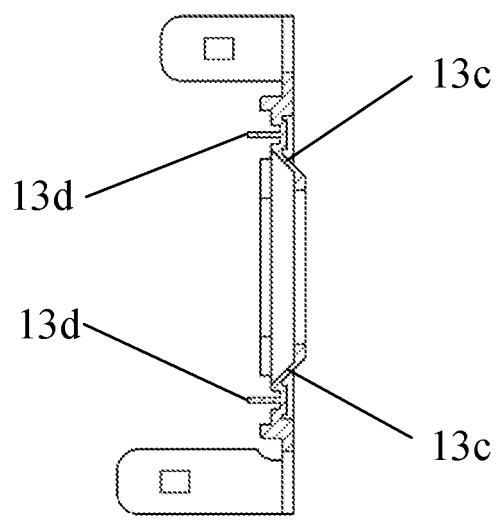
FIG. 7 is a cross-sectional view of the dustproof rubber according to the first embodiment of the present invention.
Figure 8A:
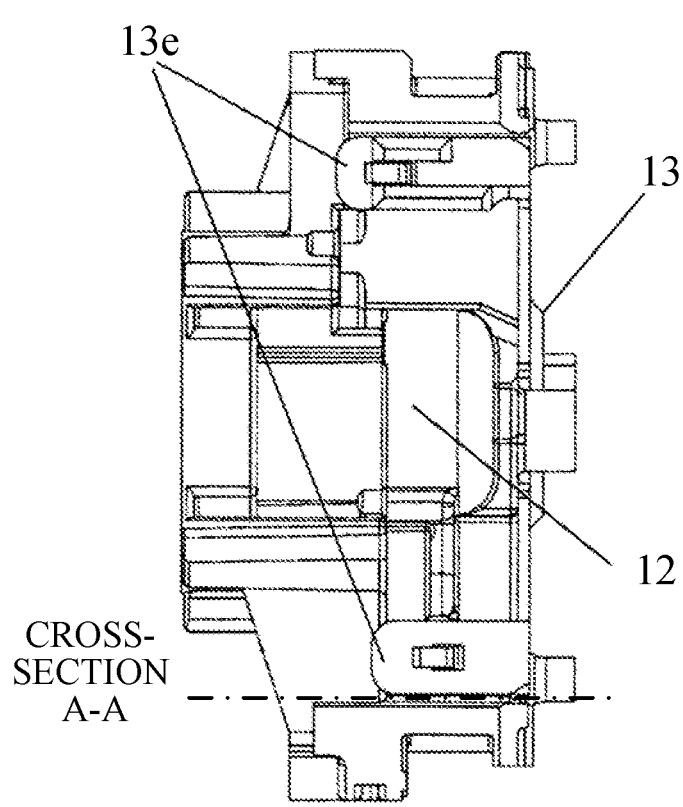
FIGS. 8A and 8B are a side view and a cross-sectional view of the dustproof rubber and the lens barrel according to the first embodiment of the present invention, respectively.
Figure 8B:
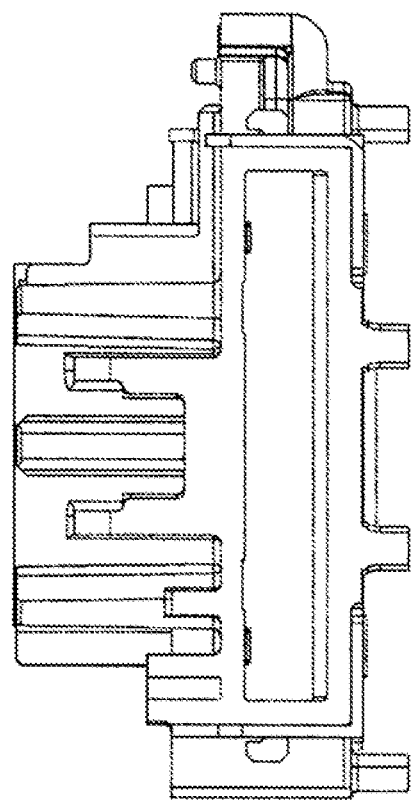

Next, a function of the dustproof rubber 13 in this embodiment will be described. FIG. 6 is a perspective view of the fixed lens barrel 12 and the dustproof rubber 13, and FIG. 7 is a cross-sectional view of the dustproof rubber 13. FIG. 8A is a side view of the fixed lens barrel 12 and the dustproof rubber 13, and FIG. 8B illustrates a cross-sectional view at a cross-section A-A. FIGS. 9A-9D illustrate partially enlarged views of FIG. 8B. The dustproof rubber 13 is a rubber member having an opening portion 13*b*, and has four engagement holes 13*a* (engaged portions). The engagement holes 13*a* engage with four engaging portions 12*a* provided on side surfaces of the fixed lens barrel 12. Thereby, the dustproof rubber 13 is fixed to the fixed lens barrel 12. The dustproof rubber 13 has a first sealing portion 13*c* having a substantially truncated quadrangular pyramid shape, and two second sealing portions 13*d* which are formed so as to extend in the direction orthogonal to the optical axis of the image-capturing lens unit 11, the second sealing portions 13*d* each having a substantially rectangular flat plate shape. A thickness of the first sealing portion 13*c* and a thickness of the second sealing portion 13*d* are made so as to be thinner than a thickness of the dustproof rubber 13 other than the first sealing portion 13*c* and the second sealing portion 13*d*. The thickness of the first sealing portion 13*c* and the thickness of the second sealing portion 13*d* may be the same, or one may be thicker than the other. The shape of the second sealing portion 13*d* is not limited to the above-described substantially rectangular flat plate shape, and may be a convex shape that protrudes in an optical axis direction of the image-capturing lens unit 11.

Figure 9A:
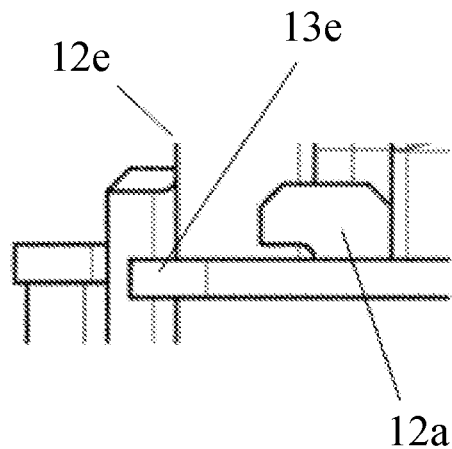
FIGS. 9A to 9D are partially enlarged views of extending portions of the dustproof rubber according to the first embodiment of the present invention.
Figure 9B:
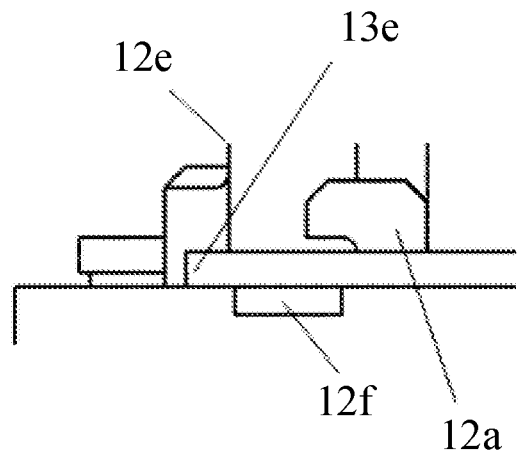
Figure 9C:
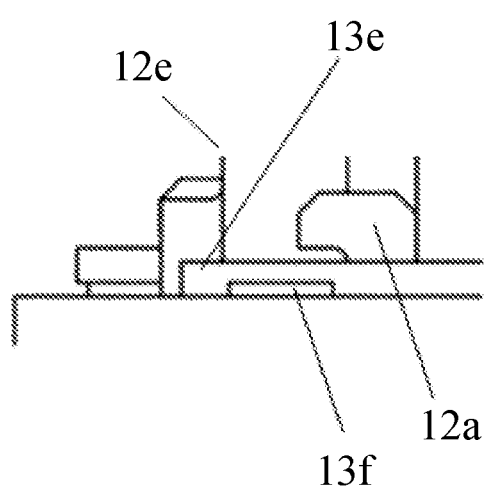
Figure 9D:
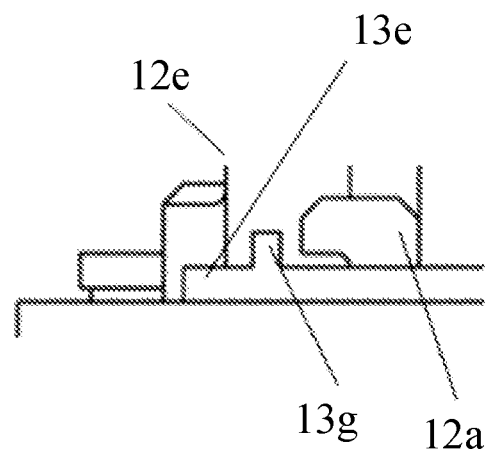

The dustproof rubber 13 has extending portions 13*e* (FIG. 9A) extending toward an object side in the optical axis direction around the engagement holes 13*a*, and the extending portions 13*e* extend to protrude from an outer shape 12*e* of the fixed lens barrel 12 (ends of the extending portions 13*e* are located outside an end of the fixed lens barrel 12.). As a result, by grasping the extending portions 13*e* to engage the engagement holes 13*a* with the engaging portions 12*a*, it is possible to easily perform assembly when the dustproof rubber 13 is attached to or detached from the fixed lens barrel 12. Here, although the extending portions 13*e* extend to protrude from the outer shape 12*e* of the fixed lens barrel 12, any shape may be used as long as it is possible to easily perform the attachment and detachment of the engaging portions 12*a* and the engagement holes 13*a*. For example, the fixed lens barrel 12 may have concave shapes 12*f* (FIG. 9B) near the extending portions 13*e*, or the extending portions 13*e* may have arch shapes 13*f* (FIG. 9C) or convex shapes 13*g* (FIG. 9D).

Figure 10:
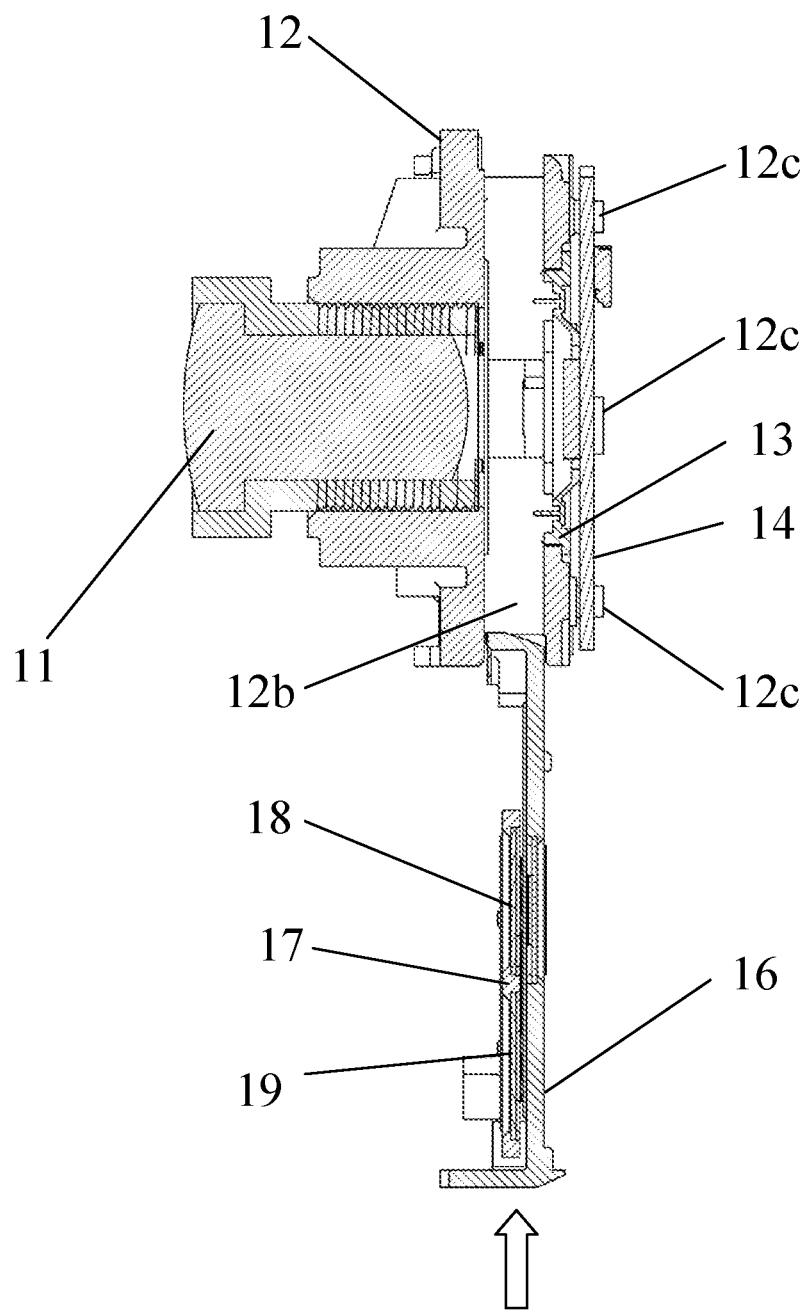
FIG. 10 is a view illustrating a state of a start of incorporating a filter base and a filter holding frame into the fixed lens barrel according to the first embodiment of the present invention.

FIGS. 10 to 13 are views illustrating a sequence when the filter base 16 and the filter holding frame 17 are incorporated into the fixed lens barrel 12. FIG. 10 is a view illustrating a state immediately after start of incorporating the filter base 16 and the filter holding frame 17. The dustproof rubber 13 is attached to the fixed lens barrel 12, and the image sensor board 14 is bonded and fixed by a plurality of bonding portions 12*c*. In this embodiment, the image sensor board 14 is fixedly bonded to the fixed lens barrel 12, but may be fixed with a screw or fixed by being urged by an elastic member. In this state, the filter holding frame 17 to which the infrared cut filter 18 and the dummy glass 19 are fixed and the filter base 16 are inserted in the direction orthogonal to the optical axis indicated by an arrow in FIG. 10 through the opening portion 12*b* provided on the side surface of the fixed lens barrel 12.

Figure 11:
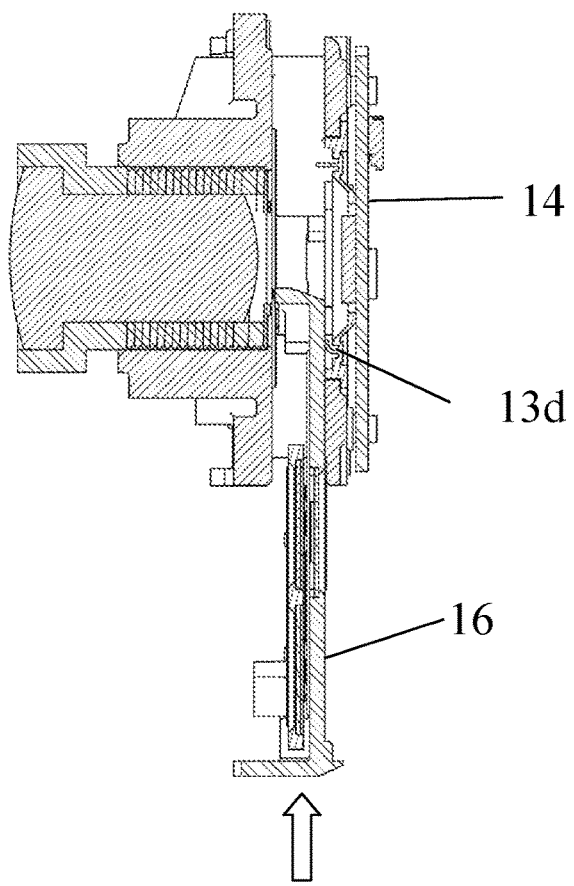
FIG. 11 is a view illustrating a state where the filter base and the filter holding frame are being incorporated into the fixed lens barrel according to the first embodiment of the present invention.

FIG. 11 is a view illustrating a state where the filter base 16 and the filter holding frame 17 are further inserted into the fixed lens barrel 12, compared with the state in FIG. 10. At this time, one of the second sealing portions 13*d* of the dustproof rubber 13 contacts the filter base 16, and the second sealing portion 13*d* is bent by elastic deformation in the direction orthogonal to the optical axis indicated by an arrow in FIG. 11 and is in sliding contact with the filter base 16. For this reason, the second sealing portion 13*d* applies a force acting in a direction opposite to the arrow in FIG. 11 to the filter base 16. Further, the dustproof rubber 13 is pressed toward the image sensor side in the optical axis direction by the filter base 16 via the second sealing portion 13*d*, but since it is engaged with the fixed lens barrel 12 by the engagement holes 13*a*, it does not move to the image sensor side in the optical axis direction. As a result, a harmful load is not applied to the image sensor board 14 that is in contact with the sealing member 13, and thus an adhesion misalignment of the image sensor board 14 can be prevented. This effect can be further produced by reducing the thickness of the second sealing portion 13*d* as described above.

Figure 12:
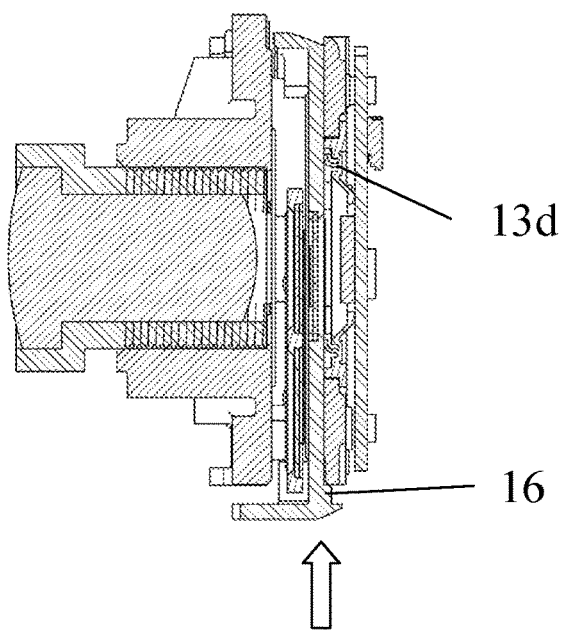
FIG. 12 is a view illustrating a state before the incorporation of the filter base and the filter holding frame into the fixed lens barrel is completed according to the first embodiment of the present invention.

FIG. 12 is a view illustrating a state where the filter base 16 and the filter holding frame 17 are further inserted into the fixed lens barrel 12, compared with the state in FIG. 11. At this time, in addition to the one second sealing portion 13*d* of the dustproof rubber 13, the other second sealing portion 13*d* also contacts the filter base 16, and the two second sealing portions 13*d* are bent in the direction orthogonal to the optical axis indicated by an arrow in FIG. 12 and are in sliding contact with the filter base 16.

Figure 13:
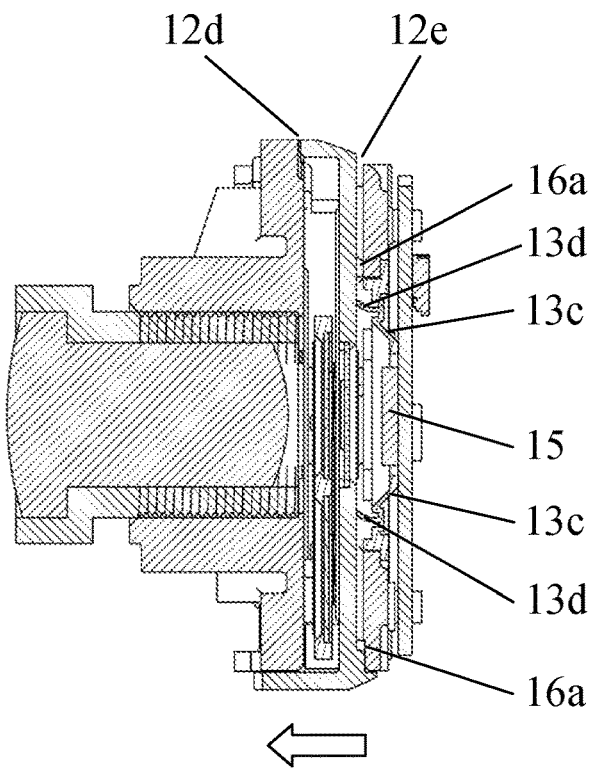
FIG. 13 is a view illustrating a state in which the incorporation of the filter base and the filter holding frame into the fixed lens barrel is completed according to the first embodiment of the present invention.

FIG. 13 is a view illustrating a state where the insertion of the filter base 16 and the filter holding frame 17 into the fixed lens barrel 12 is completed. When the insertion is completed, a plurality of contacting portions 16*a* provided on the image sensor side of the filter base 16 contact an inner surface of the opening portion of the fixed lens barrel 12. Thereby, the filter base 16 and the filter holding frame 17 move to an object side in the optical axis direction indicated by an arrow in FIG. 13. Then, a gap 12*d* on the object side between a side surface of the filter base 16 and a side surface of the fixed lens barrel 12 is almost eliminated, and foreign substances is prevented from entering through the gap 12*d*, and the filter holding frame 17 can slide well between the fixed lens barrel 12 and the filter base 16 without rattling. At this time, even if foreign substances enter from a gap 12*e* formed on the image sensor side between a side surface of the filter base 16 and a side surface of the fixed lens barrel 12, the foreign substrates are sealed by the second sealing portions 13*d* of the dustproof rubber 13. Further, even if the foreign substances enter from between the fixed lens barrel 12 and the image sensor board 14, the foreign substances are sealed by the first sealing portion 13*c* of the dustproof rubber 13. As described above, the dustproof rubber 13 surrounds a periphery of a light receiving surface of the image sensor 15, so that the foreign substances do not reach the light receiving surface of the image sensor 15.

Second Embodiment

Hereinafter, the image-capturing apparatus according to a second embodiment of the present invention will be described with reference to FIGS. 14-17. The same parts as those in the first embodiment are denoted by the same reference numerals, and only different parts will be described.

Figure 14:
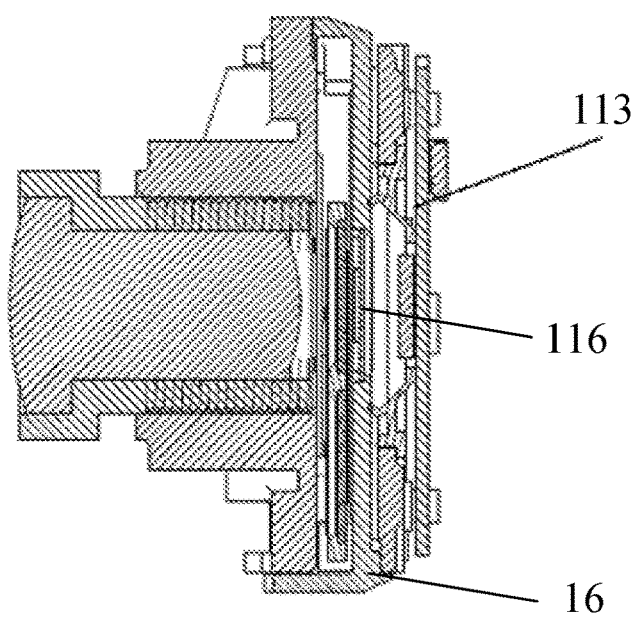
FIG. 14 is a cross-sectional view of a lens barrel unit according to a second embodiment of the present invention.
Figure 15:
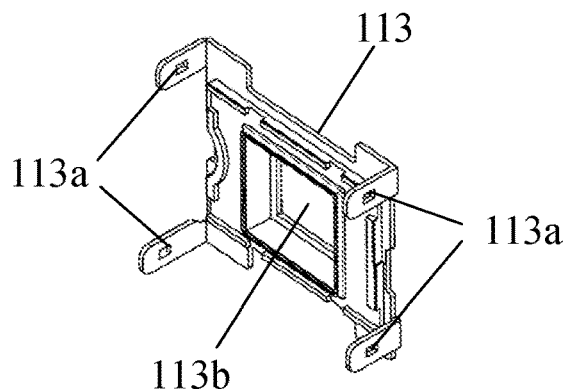
FIG. 15 is a perspective view of a dustproof rubber according to the second embodiment of the present invention.
Figure 16:
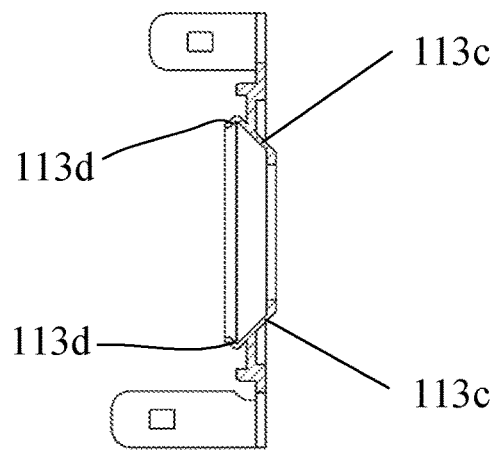
FIG. 16 is a cross-sectional view of the dustproof rubber according to the second embodiment of the present invention.
Figure 17:
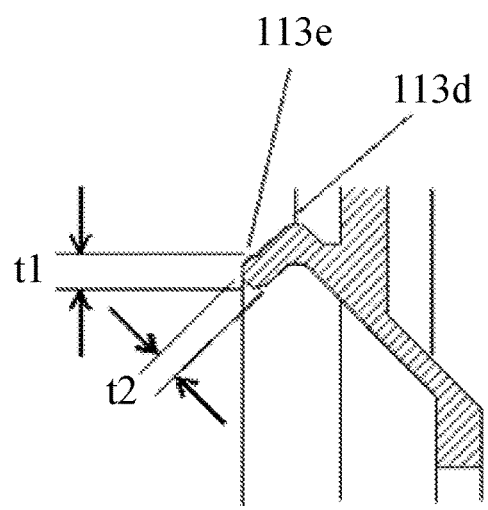
FIG. 17 is a partially enlarged view of the cross-sectional view of the dustproof rubber according to the second embodiment of the present invention.

FIG. 14 is a cross-sectional view of a lens barrel unit 105, FIG. 15 is a perspective view of a dustproof rubber 113, and FIG. 16 is a cross-sectional view of the dustproof rubber 113. FIG. 17 is a partially enlarged view of the cross-sectional view of the dustproof rubber 113. The only difference from the first embodiment is the shape of the dustproof rubber.

The dustproof rubber 113 is a rubber member having an opening portion 113*b*, and has four engagement holes 113*a*. The dustproof rubber 113 is fixed to the fixed lens barrel 12 by engaging the engagement holes 113*a* with four engaging portions 12*a* provided on the side surface of the fixed lens barrel 12. The dustproof rubber 113 has a first sealing portion 113*c* having a substantially truncated quadrangular pyramid shape, and a second sealing portion 113*d* having a square bellows shape whose opening shape is substantially rectangular. A thickness of the first sealing portion 113*c* and a thickness of the second sealing portion 113*d* are made so as to be thinner than a thickness of the dustproof rubber 113 other than the first sealing portion 113*c* and the second sealing portion 113*d*. Hereinafter, a function of the dustproof rubber 113 when the filter base 16 and the filter holding frame 17 are incorporated into the fixed lens barrel 12 is the same as in the first embodiment, and the first sealing portion 113*c* and the second sealing portion 113*d* of the dustproof rubber 113 prevents foreign substances from reaching the light receiving surface of the image sensor 15. The second sealing portion 113*d* of the dustproof rubber 113 is not limited to this embodiment as long as it is an elastic body having a shape surrounding the opening portion 113*b*.

The second sealing portion 113*d* is made such that a thickness t1 of a vicinity 113*e* of the opening portion 113*b* that is in sliding contact with the filter base 16 is thicker than a thickness t2 of the second sealing portion 113*d*. Accordingly, when the filter base 16 and the filter holding frame 17 are incorporated into the fixed lens barrel 12, there is no case that the vicinity 113*e* of the opening portion 113*b* in the second sealing portion 113*d* is slid up with the filter base 16 to be turned up and a gap between the second sealing portion 113*d* and the filter base 16 is generated. Further, in this embodiment, a dummy glass 116 is fixed to the filter base 16 for dust sealing, but when the filter base 16 and the filter holding frame 17 are incorporated into the fixed lens barrel 12, there is no case that the vicinity 113*e* of the opening portion 113*b* in the second sealing portion 113*d* bends and contacts the dummy glass 116 and the dummy glass 116 is dirtied or damaged. Of four sides of the vicinity 113*e* of the opening portion 113*b* in the second sealing portion 113*d*, at least two sides orthogonal to the insertion direction of the filter base 16 may have a thickness thicker than the thickness of the second sealing portion 113*d*.

As described above, in the configuration in which the filter switching mechanism for inserting the filter into the optical path and removing the filter from the optical path is inserted through the opening portion provided on the side surface of the lens barrel, the image-capturing apparatus capable of preventing foreign substances from adhering to the light receiving surface of the image sensor can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-074542, filed on Apr. 10, 2019, Japanese Patent Application No. 2019-090883, filed on May 13, 2019, Japanese Patent Application No. 2019-098375, filed on May 27, 2019, and Japanese Patent Application No.

2019-163542, filed on Sep. 9, 2019, which are hereby incorporated by reference herein in their entirety.

What is claimed is:

1. An image-capturing apparatus comprising:
a board configured to hold an image sensor;
a holding member configured to hold an optical member which is able to be inserted into and removed from an optical path; and
a sealing member configured to surround a periphery of a light receiving surface of the image sensor, the sealing member being provided between the board and the holding member,
wherein the sealing member includes a first sealing portion that contacts the board and a second sealing portion that contacts the holding member, and
wherein the holding member is inserted into an inside of a lens barrel from a direction orthogonal to an optical axis direction of an image-capturing lens through an opening portion provided on a side surface of the lens barrel.

2. The image-capturing apparatus according to claim 1, wherein the first sealing portion seals a gap between the board and the lens barrel, and
wherein the second sealing portion seals a gap between the lens barrel and the holding member.

3. The image-capturing apparatus according to claim 1, wherein the sealing member includes a plurality of engaged portions that engage with a plurality of engaging portions provided on the lens barrel.

4. The image-capturing apparatus according to claim 3, wherein at least one of the plurality of engaged portions has an extending portion that extends in the optical axis direction, and
wherein an end of the extending portion is located outside an end of the lens barrel.

5. The image-capturing apparatus according to claim 3, wherein at least one of the plurality of engaged portions has an extending portion that extends in the optical axis direction, and
wherein the extending portion has a convex shape.

6. The image-capturing apparatus according to claim 3, wherein at least one of the plurality of engaged portions has an extending portion that extends in the optical axis direction, and
wherein the extending portion has an arch shape.

7. The image-capturing apparatus according to claim 3, wherein at least one of the plurality of engaged portions has an extending portion that extends in the optical axis direction, and
wherein the lens barrel has a concave shape near the extending portion.

8. The image-capturing apparatus according to claim 1, wherein the second sealing portion is formed so as to extend in a direction orthogonal to the optical axis direction and has a convex shape toward the optical axis direction, and
wherein the second sealing portion contacts the holding member with the second sealing portion being elastically deformed.

9. The image-capturing apparatus according to claim 8, wherein the second sealing portion has a plate shape extending in the optical axis direction.

10. The image-capturing apparatus according to claim 8, wherein the second sealing portion has a bellow shape extending in the optical axis direction.

11. The image-capturing apparatus according to claim 1, wherein the second sealing portion applies a force acting on the holding member in a direction opposite to a direction in which the holding member is inserted through the opening portion.

12. The image-capturing apparatus according to claim 1, wherein the second sealing portion is in sliding contact with the holding member by bending in a direction of inserting the holding member through the opening portion.

13. The image-capturing apparatus according to claim 1, wherein the holding member holds the optical member so as to be insertable into and removable from an optical path by using an optical member holding frame that is movable in a direction orthogonal to the optical axis direction.

14. The image-capturing apparatus according to claim 1, wherein a thickness of the first sealing portion and a thickness of the second sealing portion are thinner than a thickness of other portions of the sealing member.

15. The image-capturing apparatus according to claim 1, wherein the sealing member is an elastic member.

16. The image-capturing apparatus according to claim 1, wherein of the second sealing portion, a thickness of a vicinity of a contact surface contacting the holding member is thicker than a thickness of other portions of the second sealing portion.

17. The image-capturing apparatus according to claim 1, wherein of the second sealing portion, a thickness of a vicinity of a contact surface contacting the holding member is thicker than a thickness of other portions of the second sealing portion, the vicinity being formed so as to extend in a direction orthogonal to a direction of inserting the holding member from an opening portion provided on a side surface of the lens barrel.

* * * * *